United States Patent [19]

Pringle et al.

[11] 3,980,230

[45] *Sept. 14, 1976

[54] SPRAYER-MIXER

[76] Inventors: Orvi C. Pringle, 8630 - 220 SW., Edmonds, Wash. 98020; John Beheyt, 10021 - 126 NE., Kirkland, Wash. 98033

[ * ] Notice: The portion of the term of this patent subsequent to Feb. 11, 1992, has been disclaimed.

[22] Filed: Jan. 6, 1975

[21] Appl. No.: 539,040

Related U.S. Application Data

[63] Continuation of Ser. No. 397,216, Aug. 14, 1973, Pat. No. 3,865,308.

[52] U.S. Cl. ................................................ 239/61
[51] Int. Cl.² ........................................... B05B 7/25
[58] Field of Search .......... 239/126, 127, 303, 304, 239/61, 172, 317, 310, 318, 142; 222/134; 137/99

[56] References Cited
UNITED STATES PATENTS

| | | | |
|---|---|---|---|
| 2,590,007 | 3/1952 | Griswold | 137/99 X |
| 2,890,836 | 6/1959 | Gusner et al. | 239/117 |
| 3,097,764 | 7/1963 | Loeser | 222/55 |
| 3,372,875 | 3/1968 | Torrey | 239/126 X |
| 3,380,658 | 4/1968 | Stasz et al. | 239/127 X |
| 3,865,308 | 2/1975 | Pringle et al. | 239/61 |

*Primary Examiner*—John J. Love
*Attorney, Agent, or Firm*—Seed, Berry, Vernon & Baynham

[57] ABSTRACT

A spray mechanism for use with diluted chemicals wherein a concentrated chemical as well as the predetermined amount of diluting liquid are simultaneously pumped to the spray nozzle and are admixed at the spray nozzle. The nozzle and pumping mechanism are such that a closing of the nozzle stops the pumps which supply the chemicals without interrupting the movement of the prime mover.

3 Claims, 2 Drawing Figures

SPRAYER-MIXER

This is a continuation of application Ser. No. 397,216, filed Aug. 14, 1973, now U.S. Pat. No. 3,865,308.

BACKGROUND OF THE INVENTION

It has long been recognized as necessary for the control of some insects and some herbs or weeds in large scale farming operations that it is necessary to use a spray technique to assure reasonable coverage. In the past the spray technique has been handled by mobile spray units either transporting a bulk tank of spray along the ground and spraying the necessary area or alternatively transporting the premixed sprays in airplanes and covering the area from the air. The presently used procedure has presented problems in that the spray was required to be premixed and therefore if the spray was not used because of an incorrect quantity or adverse weather conditions it had to be dumped or disposed of in some other way. The Environmental Protection Act has prohibited the dumping of any toxic material under the threat of a very large fine. It has therefore become a problem of how to handle excess chemical material at the end of the spray or premixed chemicals impossible to be utilized because of weather or other adversity.

Another problem with the previous method of spray control is in the fact that the individuals doing the spraying have had to premix the spray with the diluting liquid under conditions which are not designed for safety. The concentrated spray material is very toxic and dangerous and accidental contact with the individual would result in death under some circumstances. It is far preferable that the toxic material be handled only by trained personnel in the manufacturing facility of the material where proper safety procedures may be instituted. Thus untrained and perhaps unwary individuals such as the people who actually do the spraying need not come into any contact whatsoever with the concentrated material.

With the bans upon any material that has a persistent life the available chemicals for use have a short life. These short lived chemicals will deteriorate in a premixed tank in a very short amount of time, therefore eliminating the possibility of storing these chemicals.

One of the solutions to the problems noted above is in the use of a concentrated chemical which is mixed only on an as-needed basis and preferably, ahead of the spray nozzle itself, so that there would be little or no waste whatsoever. Mixing ahead of the nozzle has the advantage in that the spray operator does not have to contact any of the concentrated chemical but need only direct the spray, which is of a dilute substance.

Prior patents dealing with the mixture of two or more substances and pertinent to the invention known to the inventor are U.S. Pat. No. 2,573,949 granted Nov. 6, 1951, to Blizzard; U.S. Pat. No. 3,592,386 granted July 13, 1971, to Tschudy; and U.S. Pat. No. 3,640,461 granted Sept. 26, 1969, to Koll.

With the foregoing problems and prior art in mind, it is an object of the present invention to provide a mechanism whereby a concentrated chemical and a diluting material may be admixed ahead of the nozzle immediately prior to the spraying of the substance.

Another object of the present invention is to provide a spray control mechanism wherein the operator upon opening or closing the nozzle controls the supply pumps. The liquid flow is thereby controlled by the operator by controlling the nozzle.

Still another object of the present invention is a pumping mechanism for accurately mixing and pumping through a spray nozzle a concentrated material and a diluting material. The two materials are supplied by separate pumps and the interconnection between the pumps is of such a nature that the relative pumping speed or liquid flow is a constant, assuring a consistent end product having the prescribed proportions.

DETAILED DESCRIPTION OF THE DRAWINGS

Figure 1:
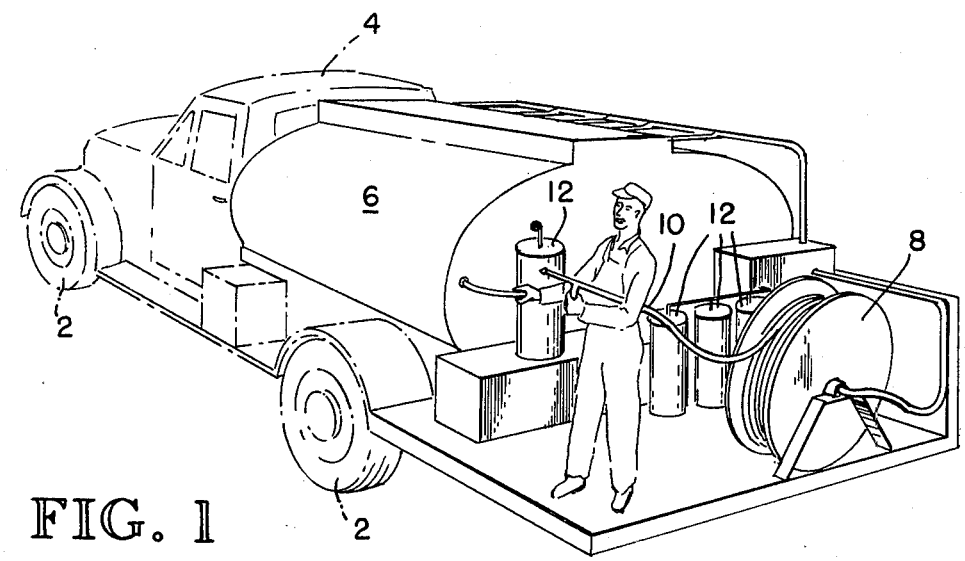
FIG. 1 is an isometric view showing the general environment in which the present invention may be utilized.

As seen in FIG. 1, a typical spraying truck is shown and comprises ground contacting wheels 2, a main framework, not shown, a cab 4, a holding tank 6 and a reel 8 upon which a hose 10 may be coiled. In addition to the relatively standard mechanisms hereinabove described, the present mechanism will further include a plurality of removable tanks 12 which may be selectively interconnected with the system, whereby the desired concentrate may be pumped and admixed ahead of the nozzle as will be hereinafter described in greater detail.

Figure 2:
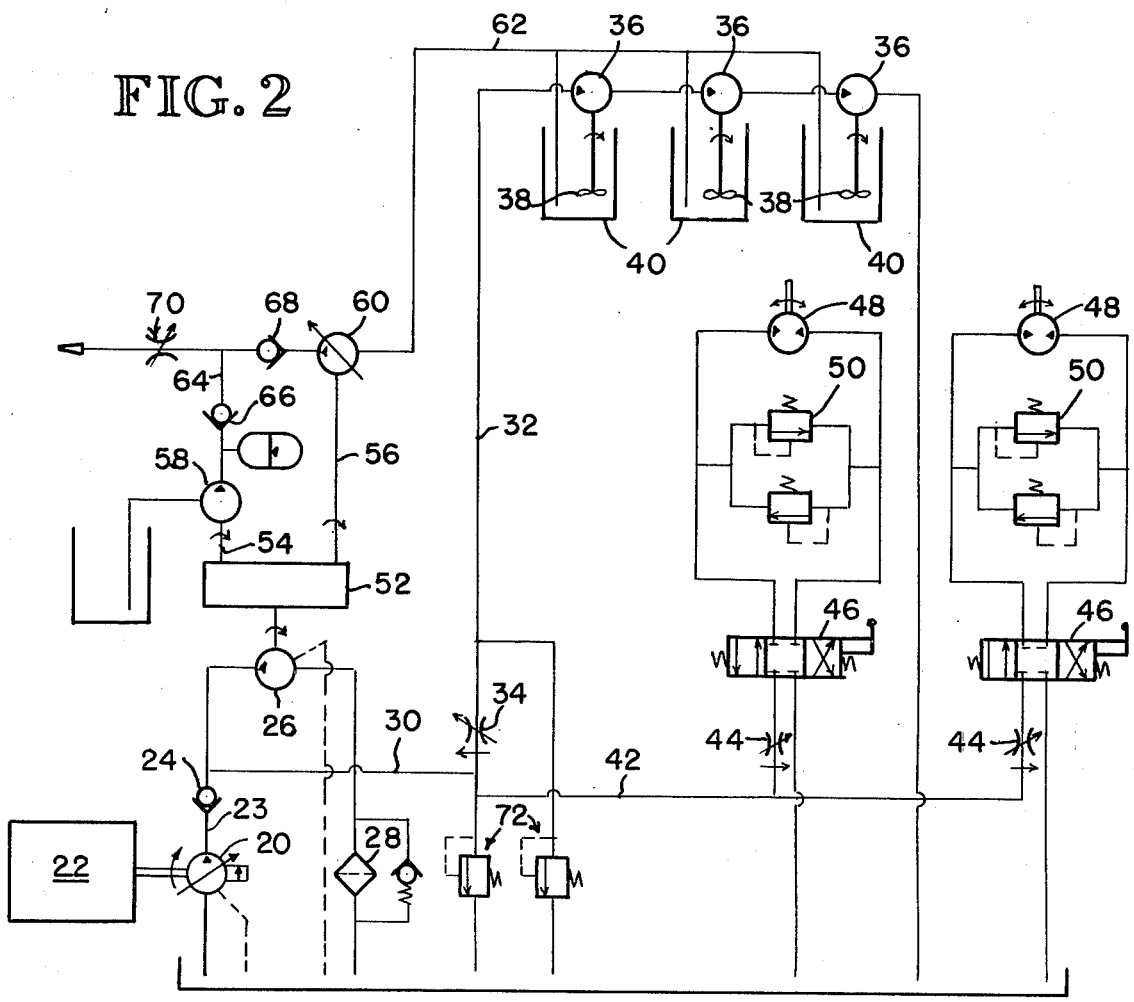
FIG. 2 is a schematic representation of the control circuit of the present invention.

As seen in FIG. 2, the preferred embodiment of the present invention utilizes a hydraulic control system which includes a pressure compensated, variable volume, hydraulic piston pump 20 driven by a prime mover 22, which would probably be the truck engine. Downstream of the pump 20 is a check valve 24. The fluid from the pump drives a fixed displacement, hydraulic piston motor 26. The fluid, after passing through the piston motor 26, returns to the sump via a filter 28. Fluid from the pump 20 is also direct via line 30 to line 32, which includes a hydraulic pressure compensated flow control valve 34.

The hydraulic fluid pumped through line 32 is directed to a plurality of fixed displacement, hydraulic agitation motors 36 which drive agitators 38 placed within the chemical tanks 40 which normally contain the concentrated chemicals.

Hydraulic fluid under pressure from pump 20 is likewise supplied to line 42, then via hydraulic pressure compensator flow control valves 44 and hydraulic directional control valves 46 to fixed displacement hydraulic reel motors 48 for driving the reel which winds and unwinds the hose on the spray rig. The control circuit for the reels also includes a pair of hydraulic cross-line relief valves 50 for safety.

Piston motor 26 drives a rigid shaft which, in turn, drives a gear reducer 52 which, via rigid shafts 54 and 56, normally driven at differing rates, drives fixed displacement piston pump 58 to supply the water and variable displacement pump 60 to provide the concentrated chemicals. The chemicals are provided from the tanks 40 via line 62 and the diluting water is supplied via line 64, which includes a surge flow tank 65 and a check valve 66 which prevents reverse flow. Line 62 likewise includes a check valve 68 to prevent reverse flow.

The fluids pumped through lines 62-64 are intermixed at the juncture of these lines and are subsequently dispersed through the spray nozzle 70.

It is to be noted that a pair of hydraulic relief valves 72 is included to prevent a dangerous overpressurization within the system.

During operation, the closing of spray nozzle 70 will cause a pressure buildup within the water line 64. A non-yielding mechanical interface 52, 54, 56 interconnects the water portion and the hydraulic portion such that the increased water pressure is immediately reflected in an increase in pressure in the hydraulic system. The increase in pressure in the hydraulic line causes pressure compensating pump 20 to stroke back and thereby maintain pressure in the hydraulic line and thus the water supply line. It is to be noted that the relationship between the water pressure and the hydraulic pressure is constant and determined by the differences in displacement of the respective pumps.

Thus it can be seen that the present invention allows a mixture of fluids to be sprayed without necessity of pre-mixing and, further, that the relative quantity can be easily controlled just prior to entering the spray nozzle. When the nozzle is closed, essentially all of the pre-mixed chemical has been utilized and no further solution will be supplied until the nozzle is again opened.

The embodiments of the invention in which an exclusive property or privilege are claimed are defined as follows:

1. A fluid mixing and spraying system comprising a prime mover, a pressure compensated, positive displacement hydraulic pump driven by the prime mover, said hydraulic pump having a variable volumetric outflow including an operating volumetric outflow condition and a minimal volumetric outflow condition, hydraulic drive means, hydraulic line means interconnecting said hydraulic pump and said hydraulic drive means,
    a water reservoir, a positive displacment water pump for pumping water from said water reservoir, a chemical solution reservoir, a positive displacement solution pump for pumping solution from the solution reservoir, means for varying the output of the solution pump for varying solution proportions, means interconnecting said water pump and said solution pump to said hydraulic drive means, conduit means interconnecting said water pump and said solution pump, a spray nozzle attached to said interconnecting conduit means for controlling the discharge from the interconnected pumps, said interconnecting conduit means, positive displacement water and solution pumps, hydraulic drive means, and hydraulic line means forming a direct power link between said pressure compensated hydraulic pump and said spray nozzle whereby the closing of said spray nozzle backs the driving power directly back through the entire system and directly applies back pressure to said pressure compensated hydraulic pump for reducing the volumetric outflow of the hydraulic pump and thus places the whole system in a passive condition.

2. The fluid mixing and spraying system as in claim 1; said hydraulic drive means including a hydraulic piston motor.

3. A fluid mixing and spraying system including a positive displacement, pressure compensated hydraulic pump having a variable volumetric outflow including an operating volumetric outflow condition and a zero volumetric outflow condition, a spray nozzle, means for pumping water to the spray nozzle, means for pumping solution to the spray nozzle, hydraulically powered drive means for powering the water and solution pumping means, and hydraulic conduit means coupling the drive means to said hydraulic pump, said water and solution pumping means, hydraulically powered drive means, and hydraulic conduit means forming a power link directly coupling the spray nozzle to said hydraulic pump for placing said hydraulic pump in said zero volumetric outflow condition when said spray nozzle is closed for placing the system in a passive condition.

\* \* \* \* \*